UNITED STATES PATENT OFFICE.

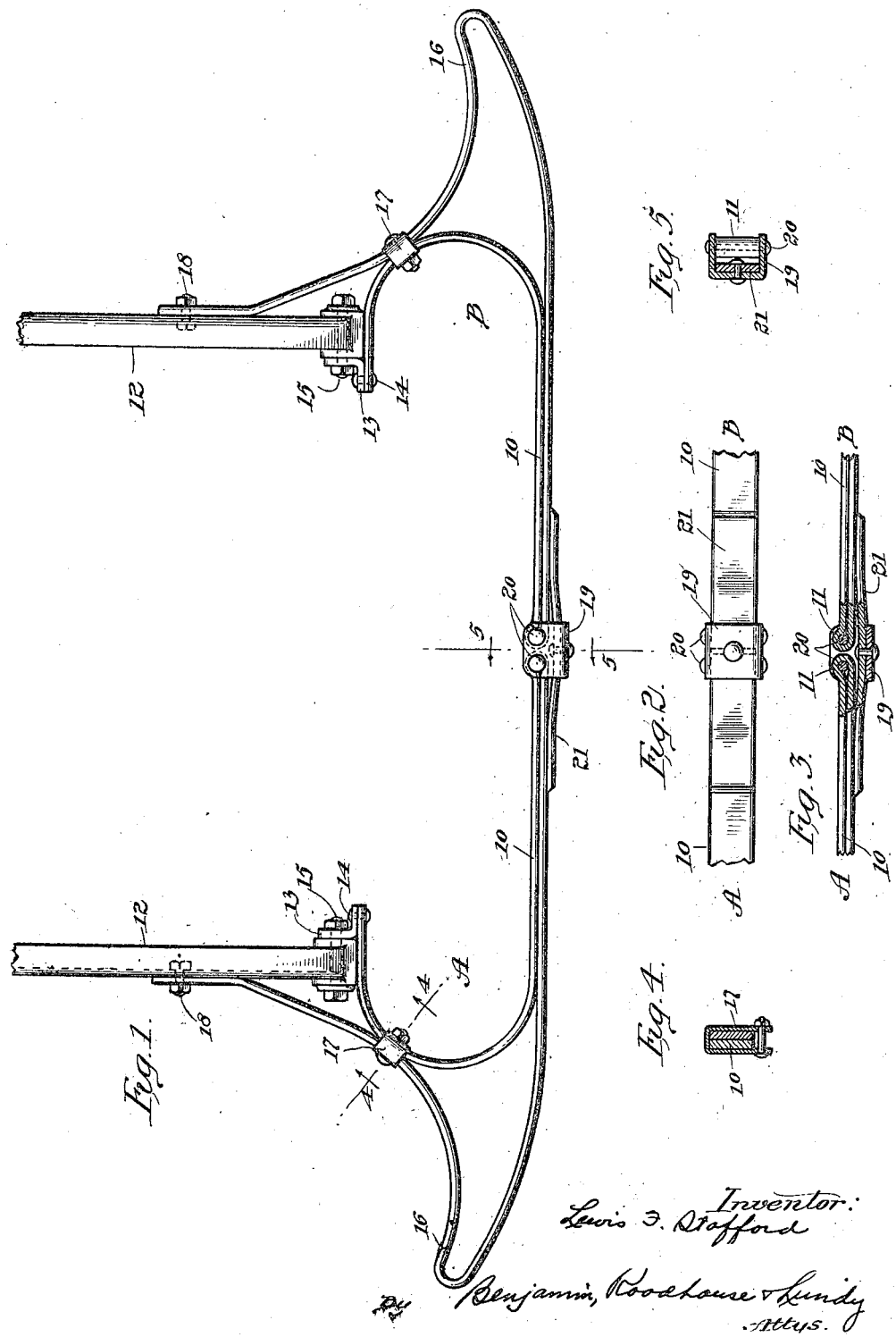

LEWIS F. STAFFORD, OF CHICAGO, ILLINOIS.

AUTOMOBILE BUMPER.

1,405,456.     Specification of Letters Patent.     Patented Feb. 7, 1922.

Application filed May 26, 1921. Serial No. 472,876.

*To all whom it may concern:*

Be it known that I, LEWIS F. STAFFORD, a citizen of the United States, residing at Chicago, in the county of Cook and State of Illinois, have invented a new and useful Improvement in Automobile Bumpers, of which the following is a specification.

My present invention relates to improvements in vehicle bumpers, and has special reference to the provision of a simple and efficient bumper for the fronts and rears of automobiles. It has been regarded as desirable now for some time to provide an impact receiving structure on the fronts and rears of vehicles for the purpose of both protecting the vehicle and the articles struck by or striking the vehicle, and for this purpose a great many structures of greater or less merit have already been designed. The increase in weight and speed of vehicles since the advent of the automobile have greatly increased the force of impact developed upon collision, and with vehicles weighing in excess of one, and sometimes, several tons, traveling at speeds in excess of twenty and sometimes thirty miles an hour the impact is so enormous that the bumper structure is either demolished or given such a permanent set or bend as to impair its further usefulness.

The particular objects of my present invention, besides the provision of a simple and economical structure, is the provision of a bumper which will be so sturdily mounted upon the vehicle and the parts of which will be so associated as to take the maximum force of impact for the weight of metal employed with the least liability of taking or receiving a permanent set or bend. In attaining these objects, I form my improved bumper from a suitable weight of spring strap metal in an integral piece bent back upon itself and having its ends formed for assembly respectively with the ends or horns and intermediate portions of the side sills of the chassis frame, while the central portions of these side elements are articulated so as to permit both elements to exert a combined resistance to an impact, but, nevertheless, to be capable of some relative movement, thereby obviating to a considerable extent the liability of being permanently set or bent thereby.

I prefer to accomplish the aforementioned objects by means of the structure illustrated in the accompanying drawing, in which:

Figure 1 is a plan of my improved bumper assembled with the side sills of a chassis frame.

Figure 2 is a fragmental detail in front elevation of the articulating means between the side elements of the bumper.

Figure 3 is a top plan, partially in section, of the structure shown in Fig. 2.

Figure 4 is a section on line 4—4, Figure 1, and

Figure 5 is a section through the center of the articulating means on line 5—5, Figure 1.

Similar reference characters refer to similar parts throughout the several views.

Each side member or element of the bumper structure consists of a strap 10, of spring metal of suitable weight for the size and power to the car to which it is designed to be attached. The strap 10 is bent back upon itself near its central portion so as to provide a bolt eye 11. The two ends of the strap extend from the bolt eye in contact or at least adjacent each other for a sufficient distance to bring them approximately opposite the side-sills 12 of the chassis frame. What may be regarded as the inner strap is then given sufficient of a bend to bring it in front of and adjacent the forward end or horn of the chassis frame to which it is attached through the instrumentality of a stamped or cast bracket 13 secured to the strap by the rivet 14, and to the horn by the bolt 15, which is now used for securing the vehicle springs to the horn. The outer strap is carried beyond the outer bend of the inner strap to form a guard 16 in front of the vehicle wheel (not shown) and on its return it is brought adjacent, and preferably clipped by means of clip 17 to the inner strap as it bends for engagement with the horn. From the clip 17 the outer strap is carried directly to the side of the straight portion, that is to the rear of the horn, of the side sill of the chassis frame to which it is secured by any suitable means, such as the bolt 18.

The articulating means between the side elements of the bumper consists of a U-shaped bracket 19, the arms whereof are bored to receive the bolts 20 which pass respectively through bolt eyes 11, in the respective side elements. Riveted to the bottom of the U-shaped bracket 19, is a short length or blade of spring material 21 which is of sufficient length to extend a short distance in front of the meeting portions of the side elements. The spring blade 20 may, preferably, be bowed, as shown in Figures 1 and 3, to put the parts under slight tension and thereby eliminate any tendency to rattle.

It will now be seen that by constructing my bumper of two side elements, I have much shortened the length of metal extending from the supports, and by forming each element of an integral piece of metal both ends of which are firmly secured or anchored, I have much stiffened and improved the respective elements. It is quite obvious that no structure of a scale suitable for use with an automobile is capable of receiving the force of an impact at relatively high speeds without bending, and it is also quite evident that by reason of the articulation of the side elements of my bumper both elements will combine to resist an impact and will at the same time permit of an initial yielding which will, without decreasing their resisting power, greatly extend their range of flexing and decrease the tendency to take a permanent bend or set. Also, in the event of the destruction of one element of my bumper this damaged element may be removed and replaced at a comparatively moderate expense, both for the part itself and its installation.

What I claim as new is:

1. A vehicle bumper comprising two similar side elements each consisting of a strap of spring metal bent upon itself intermediate its ends to provide a bolt-eye, the ends of said strap being extended from said bolt-eye to lie adjacent each other for a distance and then separated and extended to separate spaced points of attachment with a vehicle, means for securing each of the ends of each side element to a vehicle, and means for effecting the articulation of said side-elements.

2. A vehicle bumper comprising two similar side elements each consisting of a strap of spring metal bent upon itself intermediate its ends to provide a bolt-eye, the ends of said straps being extended from said bolt-eye to lie adjacent each other for a distance and then separated and extended to separate spaced points of attachment with a vehicle, means for securing each of the ends of each side element to a vehicle, means for effecting the articulation of said side elements comprising a bracket, bolts carried thereby coacting with the bolt eyes in said respective elements, and a spring carried by said bracket and extending into contact with said side elements.

3. A vehicle bumper comprising two similar side elements each consisting of a strap of spring metal bent upon itself intermediate its ends to provide a bolt-eye, the ends of said straps being extended from said bolt-eye to lie adjacent each other for a distance and then separated and extended to separate spaced points of attachment with a vehicle, means for securing each of the ends of each side element to a vehicle, and means for effecting a limitedly yielding articulation between said side elements.

4. A vehicle bumper comprising two similar side elements, each of which side elements extends in opposite directions from a substantially central point in said bumper structure for attachment with a vehicle, means for securing the rear ends of each side element to a vehicle, and means for effecting a limited yielding articulation between said side elements.

5. A vehicle bumper comprising two similar side elements, each of which side elements extends in opposite directions from a substantially central point in said bumper structure for attachment with a vehicle, means for securing the rear ends of each side element to a vehicle, and means for effecting a limitedly yielding articulation between said side elements comprising a spring blade overlapping and contacting the adjacent ends of said side elements, a bracket to which said spring is attached, and hinged connections between said bracket and said side elements.

6. A vehicle bumper comprising a pair of similarly shaped members each consisting of a strip of metal bent intermediate its ends to provide a bolt-eye, the portions of said strip of metal after forming said eye extended outwardly and rearwardly into curves of different contours whereby the ends of said strip may be secured to the vehicle at separate locations.

7. A vehicle bumper comprising a pair of similarly shaped members each consisting of a strip of metal bent intermediate its ends to provide a bolt-eye, the portions of said strip of metal after forming said eye extended outwardly and rearwardly into curves of different contours and the ends secured to the vehicle.

8. A vehicle bumper comprising a pair of similarly shaped members each consisting of a strip of metal bent intermediate its ends to provide a bolt-eye, the portions of said strip of metal after forming said eye extended outwardly and rearwardly into curves of different contours whereby the ends of said strip may be secured to the vehicle at separate locations, and means for connecting said similarly shaped members at said bolt-eyes.

9. A vehicle bumper comprising a pair of similarly shaped members each consisting of a strip of metal bent intermediate its ends to provide a bolt-eye, the portions of said strip of metal after forming said eye extended outwardly and rearwardly into curves of different contours and the ends secured to the vehicle, and means for connecting said similarly shaped members to provide an articulated joint.

Signed at Chicago, county of Cook and State of Illinois, this 29th day of April, 1921.

LEWIS F. STAFFORD.